T. MIYAGI.
AUTOMOBILE BUMPER.
APPLICATION FILED JAN. 11, 1921.
1,412,212.
Patented Apr. 11, 1922.
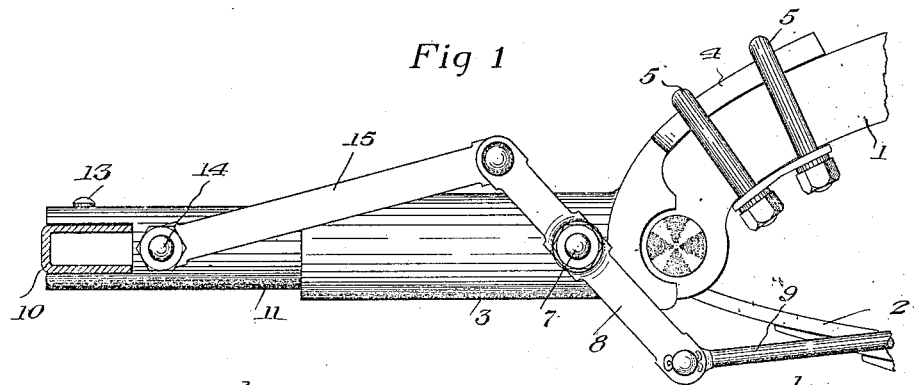
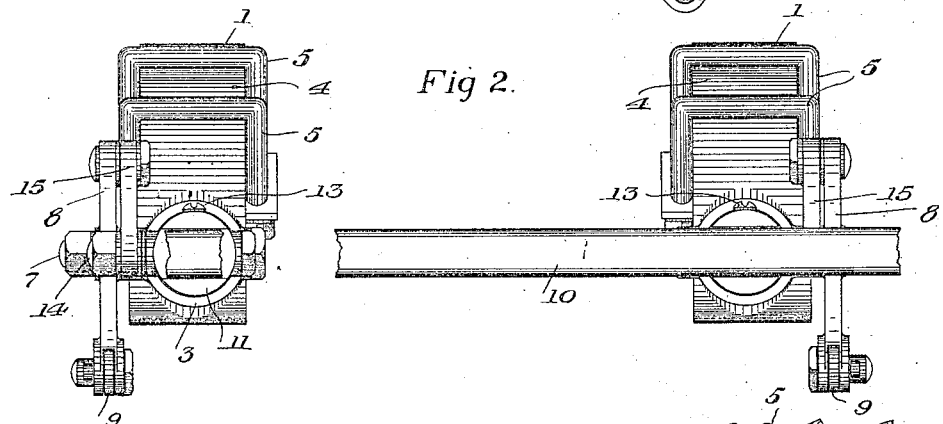
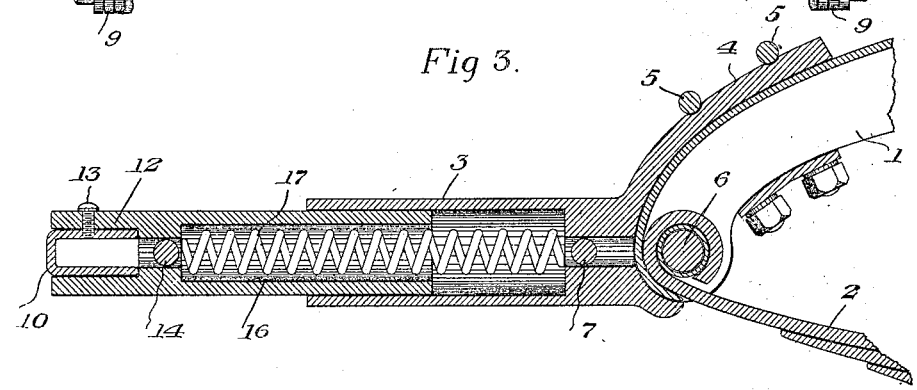
Inventor
Takeo Miyagi,
By Victor J. Evans
Attorney

UNITED STATES PATENT OFFICE.

TAKEO MIYAGI, OF WAIPAHU, TERRITORY OF HAWAII.

AUTOMOBILE BUMPER.

1,412,212.    Specification of Letters Patent.    Patented Apr. 11, 1922.

Application filed January 11, 1921. Serial No. 436,517.

*To all whom it may concern:*

Be it known that I, TAKEO MIYAGI, a subject of the Emperor of Japan, residing at Waipahu, in the Territory of Hawaii, have invented new and useful Improvements in Automobile Bumpers, of which the following is a specification.

The object of my present invention is the provision of an improved construction of automobile bumper through the medium of which an automobile clutch may be disconnected and the brake of the automobile applied when the movable member of the bumper is pressed rearwardly by contact with an object.

To the attainment of the foregoing, the invention consists in the improvement as hereinafter described and definitely claimed.

In the accompanying drawings, forming part hereof:—

Figure 1 is a side elevation, partly in section, of my improvement.

Figure 2 is a broken front elevation illustrative of the improvement.

Figure 3 is a longitudinal vertical section taken through one of the tubular holders of the improvement, and showing the parts that cooperate with said tubular holder.

My improvement is applied to the forward chassis portions 1 of an automobile to which springs 2 are also connected in the ordinary well known manner.

Among other elements my improvement comprises tubular holders 3. These holders are provided with heel portions 4 that straddle the chassis portions 1 as best shown in Figures 1 and 3, and are connected to the said chassis portions through the medium of shackles 5. The bolts 6 through the medium of which the springs 2 are connected with the chassis portions 1 are arranged about the proportional distance illustrated in rear of the transverse bolts 7 which are carried by the rear portions of the holders 3.

Fulcrumed on the outer portions of the bolts 7 are vertically swinging levers 8 the lower arms of which are designed to be connected by rods 9 with the clutch and the brakes of an automobile in the ordinary well known manner or in any other approved manner so that disconnection of the clutch and application of the brakes will attend the forward movement of the said lever arms.

The movable member of my bumper comprises a forward transverse bar 10, preferably of channel form in cross section, and piston portions 11. The transverse bar 10 is seated in transverse bifurcations 12 in the forward ends of the piston portions 11 and is connected thereto through the medium of set screws 13. Slightly in rear of the said bifurcations 12 the piston portions 11 are provided with transverse bolts 14, and pivotally connected to and interposed between the transverse bolts 14 and the upper arms of the levers 8 are links 15. The rear portions of the piston portions 11 are tubular as indicated by 16 to receive coil springs 17 which are housed in the piston portions 11 and the tubular holders 3 and are interposed between the same as best shown in Figure 3.

Manifestly the springs 17 will adequately cushion the movable member of the bumper when the transverse bar 10 brings up against an object in its path, and said springs will also serve to restore the movable member to its normal projected position. It will also be apparent that when the movable member of the bumper is pushed rearwardly by an object in its path, the levers 8 will be rocked clockwise with the result that the clutch will be disconnected and the brakes of the automobile applied in the manner before indicated.

As will be understood from the foregoing my improvement is simple and compact in construction and efficient in operation, and in addition the improvement is susceptible of ready application to an automobile and is not liable to detract in any measure from the finished appearance of the automobile.

Having described my invention, what I claim and desire to secure by Letters-Patent, is:—

An automobile bumper comprising tubular holders having heels shaped to straddle and be opposed and connected to the forward ends of forward chassis portions, said holders extending straight forward from said chassis portions, levers fulcrumed at intermediate points in their lengths on said holders and each having arms one of which is adapted to be connected with a clutch and brake, tubular piston portions sheathed in the tubular holders and having transverse bifurcations in their forward ends, springs housed in the said piston portions and the tubular holders and interposed between the same, transverse bolts carried by and extending laterally outward from said piston portions, links interposed between said bolts of the piston portions and the other arms of the levers, and a transverse bar connecting the forward ends of the piston portions, said bar seated in said bifurcations of the piston portions and secured thereto.

In testimony whereof I affix my signature.

TAKEO MIYAGI.